(12) United States Patent
Liu et al.

(10) Patent No.: US 11,697,228 B2
(45) Date of Patent: Jul. 11, 2023

(54) METHOD OF FILLING SIMULATED MUSCLES FOR LIMB OF CRASH TEST DUMMY FOR AUTOMOBILE

(71) Applicants: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

(72) Inventors: Zhixin Liu, Tianjin (CN); Zhixin Wu, Tianjin (CN); Hong Chen, Tianjin (CN); Weidong Liu, Tianjin (CN); Weijie Ma, Tianjin (CN); Minghao Xie, Tianjin (CN); Ye Hao, Tianjin (CN)

(73) Assignees: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

( * ) Notice: Subject to any disclaimer, the term of this patent is extended or adjusted under 35 U.S.C. 154(b) by 0 days.

(21) Appl. No.: 17/859,884

(22) Filed: Jul. 7, 2022

(65) Prior Publication Data
US 2023/0166432 A1    Jun. 1, 2023

(30) Foreign Application Priority Data
Nov. 30, 2021 (CN) .......................... 202111440695.1

(51) Int. Cl.
| | | |
|---|---|---|
| B29C 44/06 | (2006.01) |
| B29C 44/60 | (2006.01) |
| B29C 44/42 | (2006.01) |
| G01M 17/007 | (2006.01) |
| G09B 23/30 | (2006.01) |
| B29K 75/00 | (2006.01) |
| B29L 31/00 | (2006.01) |

(52) U.S. Cl.
CPC .............. *B29C 44/06* (2013.01); *B29C 44/42* (2013.01); *B29C 44/60* (2013.01); *G01M 17/0078* (2013.01); *B29K 2075/00* (2013.01); *B29L 2031/7028* (2013.01); *G09B 23/30* (2013.01)

(58) Field of Classification Search
CPC ......... B29C 44/06; B29C 44/42; B29C 44/60; B29C 31/041; B29C 33/0077; B29C 37/0053; B29C 2043/5883; B29C 44/0415; B29C 44/18; B29C 44/334; B29C 2045/2683; B29C 2045/2685; B29C 2045/2689; B29C 2045/2691; B29C 2063/485
See application file for complete search history.

*Primary Examiner* — Stella K Yi

(57) ABSTRACT

The present invention discloses a method of filling simulated muscles for a limb of an automobile crash test dummy, the simulated muscles are molded with foaming in the inner cavity of the mold; the method comprises: obtaining a filling volume of the inner cavity of the mold by using a liquid casting method, preparing an adhesive liquid film layer, preparing a filler and conducting demolding detection on the limb. Wherein step 3 is to inject the mixed filler into the inner cavity of the mold so as to be foamed in the mold to form foamed sponge, and stand until the foamed sponge is foamed to the exhaust port and does not overflow any more.

4 Claims, 3 Drawing Sheets

METHOD OF FILLING SIMULATED MUSCLES FOR LIMB OF CRASH TEST DUMMY FOR AUTOMOBILE

CROSS-REFERENCE TO RELATED APPLICATION

This application claims priority from the Chinese patent application 202111440695.1 filed Nov. 30, 2021, the content of which is incorporated herein in the entirety by reference.

FIELD OF THE APPLICATION

The present invention relates to a method of manufacturing a limb for an anthropomorphic test device, and in particular to a method of filling simulated muscles for a limb of an automobile crash test dummy.

BACKGROUND ART

The passive safety performance of an automobile is the important technical guarantee of protecting the life safety of drivers and passengers. Improvement of the technology requires to obtain injury data of a human body in the crash process depending on an automobile crash test; whereas an anthropomorphic test device (ATD) is a key test system for simulating a real human body by replacing the human body to undergo an injury and evaluating the passive safety performance of the automobile, that is a well-known "dummy for a crash test". Therefore, the biomimetic performance of the dummy for the automobile crash test is especially important for accurately evaluating the safety performance of the automobile. However, how to guarantee the similarity of the dummy for the automobile crash test and the human body in geometrical shape, the equivalence in structure and the simulative performance of a human mechanical response is the important technical content for guaranteeing the biomimetic performance of the dummy for the automobile crash test. A limb of the dummy for the automobile crash test is an important component of the dummy and is generally constituted of a skeleton, simulated skin and simulated muscles, wherein the simulated muscles play an important role in achieving mechanical transfer of viscoelasticity and meeting the biomechanical demands of the human body; whereas a manufacturing process of the simulated muscles of the limb of the dummy at the present stage remains a technical difficulty.

There are many related documents about skin of the dummy for the automobile crash test, for example, Patent CN104650320A proposes a manufacturing method for simulated skin and muscles of a human body based on radiation detection, aiming at improving the equivalence of tissue materials of the skin and the muscles and improving the corresponding proportion solution of a high polymer material; Patent CN111073172A proposes a head skin material for a crash-test dummy suitable for Chinese and a preparation method for the head skin material, aiming at preparing a raw material of head skin for the dummy and improving the proportion solution and the preparation process of the material by adjusting the use amounts of an organic matter and an inorganic matter under a certain condition; the Patent CN111004366A proposes a polyurethane-based composite for simulated tissues and organs for a dummy and a preparation method for the polyurethane-based composite, aiming at manufacturing the simulated tissues and organs for the dummy and forming a novel material proportion solution and casting molding process by blending a prepolymer and a curing agent; and the Patent CN109438659A proposes a non-yellowing polyurethane material for a crash dummy and a preparation method for the non-yellowing polyurethane material, aiming at forming a novel material proportion solution by blending a polyurethane prepolymer and a chain extender and solving the yellowing problem of the material. The Patent CN112146835A discloses a neck assembly for an anthropomorphic test equipment. As referred to in the description, various members of the crash-test dummy may be covered by polyethylene skin (such as muscle and skin assemblies) so as to achieve good biofidelity of the crash-test dummy; but how to manufacture the simulated muscles to achieve good biofidelity of the crash-test dummy is not disclosed.

In the existing literatures, development on skin and a muscle layer of the dummy for the automobile crash test is mostly focused on study on a formulation of a single biomimetic material, or skin and the muscle layer are developed as a whole. However, the real human body structure comprises skin and further comprises muscles and a skeleton. Therefore, it is not in accordance with the actual condition of the human body that one biomimetic material is purely researched, or only one human body structure is considered, and the simulation degree of a developed dummy is not high. At the present stage, there is no corresponding manufacturing method for manufacturing a limb of the dummy with higher simulation degree, and even no involvement of manufacturing and filling of a simulated muscle layer. Existing conventional manufacturing of sponge simulated muscles is to put a mixed filler foaming solution in an opened environment with a large space for foaming to form the sponge simulated muscles; and there is no unsmooth air exhaust problem in the foaming process. However, a dummy limb mold has a small sprue and a large interior space, so that the sponge simulated muscles formed outside the mold cannot be directly put into the dummy limb mold, and it requires to inject the filler foaming solution into the mold and enable the filler foaming solution to be foamed in the mold to form the sponge simulated muscles. Too large or too small filler foaming quantity can cause imbalance between interior stress of the dummy limb and external stress. Therefore, after demolding, the problems that the dummy limb may swell or shrink due to variation of the appearance dimension and the like are caused, and the quality of a product and the rate of finished products are affected. Therefore, how to enable the manufactured dummy limb to be in a balanced state between the interior stress of the dummy limb and the external stress and guarantee invariable appearance dimension of the limb is the technical difficulty for manufacturing the dummy limb.

BRIEF SUMMARY OF THE INVENTION

An objective of the present invention is to provide a method of filling simulated muscles for a limb of an automobile crash test dummy, so as to accurately control the foaming quantity and the foaming time of a filler, just enable the filler to fully fill an inner cavity of the mold and guarantee a geometrical shape and the biomimetic mechanical properties of the limb of the crash dummy.

The objective of the present invention is implemented by the following technical solution.

A method of filling simulated muscles for a limb of an automobile crash test dummy; the simulated muscles are molded with foaming in the inner cavity of the mold; the mold comprises an upper mold, a mold core, a lower mold, a sprue port and an exhaust port; and the upper mold and the lower mold are buckled to form the inner cavity of the mold. The method comprises the following steps:

Step 1: obtaining a filling volume of the inner cavity of the mold by using a liquid casting method, and then calculating a total mass of a filler according to the filling volume and a known density of foamed sponge obtained after foaming of the filler, wherein the filler is composed of a first material and a second material; and obtaining masses of the first material and the second material according to the obtained total mass of the filler and a preset hardness of the limb, wherein a skin layer is prefabricated on the inner surface of the mold in an attaching manner; and the inner cavity of the mold herein refers to a space except for the skin layer in the mold, and the inner cavity mold is empty at this time;

Step 2: preparing an adhesive liquid film layer fully pouring an adhesive liquid into the inner cavity of the mold for stilling for 20-40 s, and pouring out the residual adhesive liquid in the inner cavity of the mold to form an adhesive liquid film layer on the inner wall of the skin layer of the inner cavity of the mold;

Step 3: preparing a filler pouring the weighed first material and second material into a stirring cup for stirring for 9-12 s at a room temperature and a rotating speed of 2500-3000 r/min so as to form the filler with mixing; injecting the mixed filler into the inner cavity of the mold; enabling the filler to gradually be foamed in the mold to form foamed sponge; allowing the foamed sponge to stand for 5-8 min until the foamed sponge is foamed to the exhaust port and does not overflow from the end part of the exhaust port any more; and then completing the filling process;

Step 4: conducting demolding detection on the limb taking out a manufactured dummy limb member after separating the upper mold from the lower mold, detecting whether the dummy limb has a bulge or collapse or not by using an appearance vision; and if there is no bulge or collapse, then selecting the middle portion of the limb, and measuring the outside diameter of the middle portion with a measuring tape to judge whether the outside diameter accord with a dimension of the inner surface of the mold or not so as to complete detection on the limb.

Further, the step 1 specifically comprises the following steps:

S101: fully pouring a sufficient amount of measuring liquid into the inner cavity, with the skin layer, of the mold, and obtaining the filling volume of the inner cavity of the mold by using the liquid casting method:

$$V_{liquid}(cm^3) = \frac{M}{\rho} \qquad (1)$$

wherein $\rho$ is a density of the measuring liquid, and M is a weight of the measuring liquid; and the measuring liquid is volatile and nontoxic liquid, and the liquid has the viscosity of 1.1-1.5 cP, and preferably, is anhydrous ethanol.

S102: taking a cup residue loss in the process of dumping the filler into consideration, setting a mass redundancy coefficient, and calculating the total mass of the actually used filler in the inner cavity of the mold:

$V_{filler} = V_{liquid}$ $M_{filler} = \rho_{filler} V_{filler}$ $M_{actually\ used\ filler} = K M_{filler} \qquad (2)$ wherein $\rho_{filler}$ is a density of the foamed sponge obtained after foaming of the filler; $V_{liquid}$ is the filling volume, calculated in S101 of the inner cavity of the mold; K is the mass redundancy coefficient; $M_{filler}$ is the total mass of the filler just fully filled in the inner cavity of the mold; and $M_{actually\ used\ filler}$ is the total mass of the actually used filler.

S103: calculating masses of various components of the filler, wherein the filler is composed of the first material and the second material, a mass ratio of the first material to the second material is set according to the preset hardness of the limb so as to deduce the masses of the first material and the second material, and a calculation formula is as follows:

$$m_A = M_{actually\ used\ filler} \times \frac{A}{A+B} \qquad (3)$$

$$m_B = M_{actually\ used\ filler} \times \frac{B}{A+B}$$

wherein $m_A$ is the mass of the first material; $m_B$ is the mass of the second material; and A:B is the mass ratio of the first material to the second material.

Further, the step 3 specifically comprises the following steps:

S301: pouring the weighed first material and second material into the stirring cup for stirring for 9-12 s at the room temperature and the rotating speed of 2500-3000 r/min, and forming the filler with mixing;

S302: arranging the mold covered with the adhesive liquid film layer and a workbench top at an angle to enable the exhaust port to be higher than the sprue port and facilitate gradual fermentation of the filler from bottom to top, and exhausting air out of the inner cavity of the mold;

S303: pouring the mixed filler into the sprue port of the mold; enabling the filler to be gradually foamed in the inner cavity of the mold to form the foamed sponge; and when the foamed sponge overflows from the sprue port, covering the sprue port with a metal cover plate to prevent the foamed sponge from overflowing from the sprue port;

S304: conducting standing for 5-8 min until the foamed sponge is foamed to the exhaust port and no overflowing occurs after a small quantity of foamed sponge overflows from the end part of the exhaust port;

S305: horizontally placing the mold on the workbench for standing for 6-10 h at the room temperature, and enabling the air in the inner cavity to be naturally exhausted to complete the filling process.

Further, the first material is an isocyanate prepolymer; and the second material is combined polyether polyols.

Further, preparation of the adhesive liquid in the step 2 is as follows: a gluing liquid and a diluent are weighed according to a weight ratio of 2 to 1 and are uniformly mixed in a stirring barrel for a stirring time of 60-120 s and at a rotating speed of 800-1500 r/min to prepare a dilute adhesive liquid.

Further, the gluing liquid is a neoprene adhesive; and the diluent is toluene.

Compared with the prior art, the technical solution of the present invention has the beneficial effects that:

By using the method of filling the simulated muscles for the limb of the automobile crash test dummy of the present invention, the simulated muscles are filled in the relatively closed dummy limb mold; and with the volume of the inner cavity of the limb mold as a basis of calculating the use amount of the simulated muscle filler, the use amount of the filler just fully filling the whole inner cavity of the mold is calculated to guarantee the dimension and the geometrical shape of the appearance of the dummy limb after the filler is injected into the mold; so that the problems that the limb of the crash dummy swells or shrinks and the like are solved, the quality of a dummy limb product is improved, and the yield of the dummy limbs is increased.

| | |
|---|---|
| 1: upper mold | 2: mold core |
| 3: lower mold | 4: exhaust port |
| 5: sprue port | 6: metal circular cover |
| 7: measuring tape | a: first material    b: second material |

DETAILED DESCRIPTION OF THE PRESENT INVENTION

In order to make the objectives, the technical solutions, the beneficial effects and the noteworthy improvements of the embodiments of the present invention more clear, the technical solutions of the present invention will be clearly and completely described in detail in conjunction with accompanying drawings provided in the examples of the present invention. Apparently, all the described embodiments are only some but not all of the embodiments of the present invention. All other embodiments obtained by those of ordinary skill in the art based on the embodiments of the present invention without creative efforts shall fall within the protection scope of the present invention.

In order to solve the problems in the prior art, it requires to accurately control the foaming quantity of a filler to enable the filler to just fully fill the inner cavity of the mold without overflowing. Then, in regard to how to control the filler to just fully fill the mold, it requires to concern the following three problems: firstly, there is an intimate connection between the use amount of the filler and the volume of an inner cavity of the mold, also the inner cavity of the mold belongs to an irregular shape, and the interior volume of the inner cavity of the mold cannot be measured and calculated with a ruler directly, so that the volume is troublesome to obtain. Secondly, a foaming speed of a filler foaming solution is relatively fast; and if a speed of injecting the filler foaming solution into the mold is not fast enough, sponge is easily produced when the filler foaming solution is not poured into the cup yet, and the filler foaming solution cannot be injected into the mold. Thirdly, after foaming of the filler is completed, if a standing time is not enough, interior stress of the foamed sponge is easily incompletely released, which causes the problems of unstable mechanical properties, variation in appearance dimension and the like. According to the technical solution, with the filling volume, measured with the liquid, of the inner cavity of the mold as a basis, an actual use amount of the filler is calculated; the filler is injected into the mold to form muscle tissues which just fully fill the mold and are closely adhered to the skin layer in combination with an adhesion process of the filler and the skin layer; and thus the problem of the foaming quantity of the filler is solved. The filling technological process of the filler in the technical solution is shown in FIG. 1.

Embodiment 1: Manufacturing of Dummy Upper Arm

Figure 1:
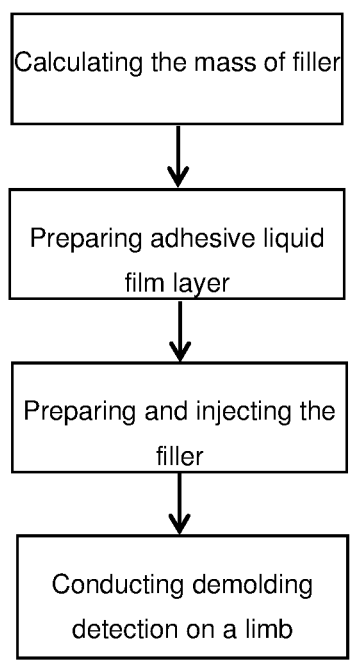
FIG. 1 is a flow chart of a method of filling simulated muscles for a limb of an automobile crash test dummy according to the present invention.
Figure 2:
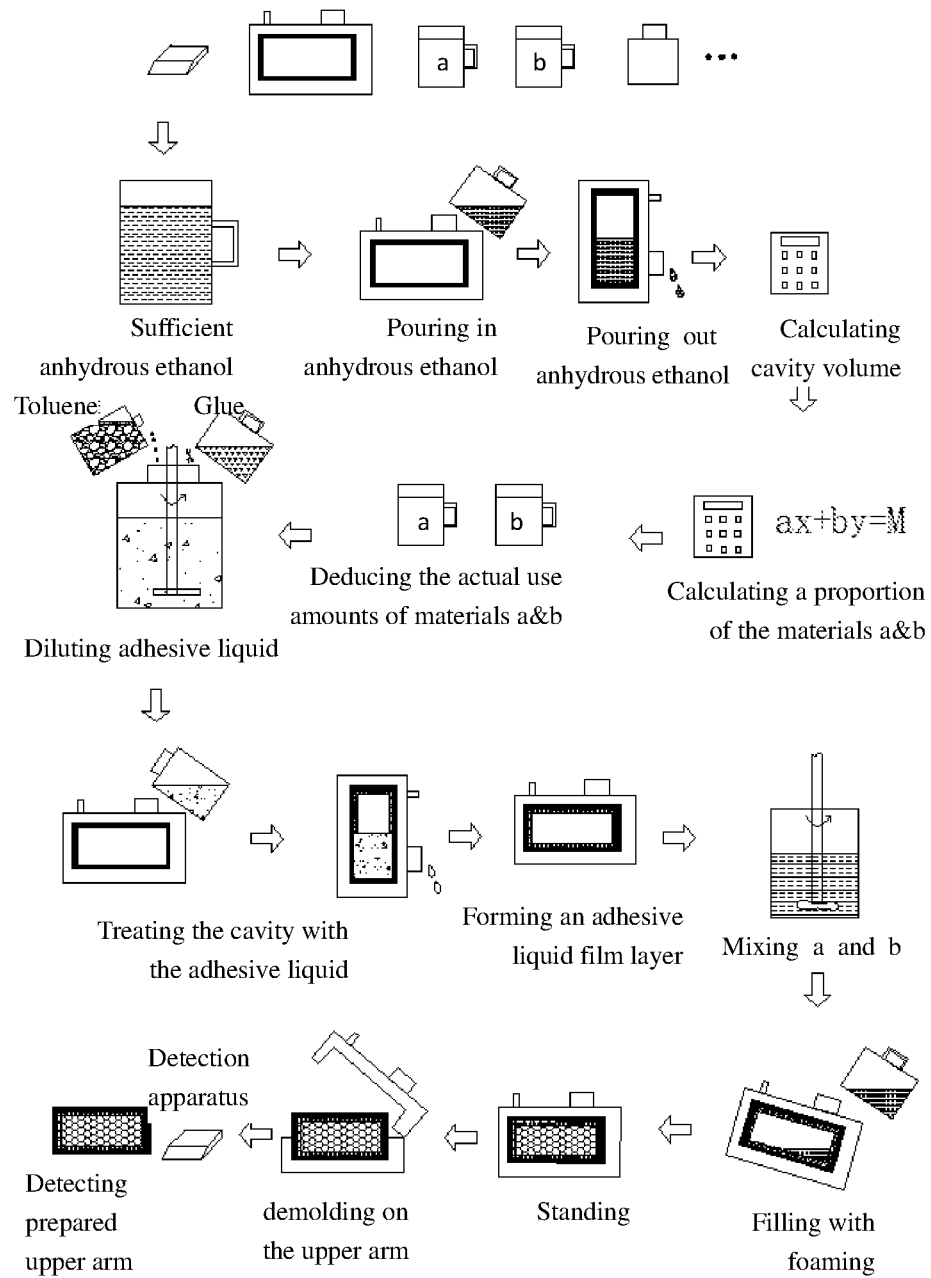
FIG. 2 is a flow chart of manufacturing simulated muscles of an upper arm according to embodiment 1.

As shown in FIGS. 1-2, this embodiment describes the method of filling simulated muscles for a limb of an automobile crash test dummy in detail with a crash dummy upper arm as a specific embodiment.

Required materials are shown in Table 1.

| Type | Materials | Effect |
|---|---|---|
| Simulated muscle volume measuring liquid | Anhydrous ethanol | For measuring a volume of an inner cavity of a mold |
| Simulated muscle filler | First material a: isocyanate prepolymer Second material b: combined polyether polyols | For preparing a raw material of simulated muscle sponge |
| Dilute adhesive liquid raw material | Diluent: toluene | For diluting an adhesive |
| | Gluing liquid: neoprene adhesive | For preparing the dilute adhesive liquid to adhere skin to a muscle layer |
| Instruments | Workbench (with an area of 0.8 m * 1.2 m) | For placing the mold and various utensils and conducting various step operations |
| | Electronic scale (0-10 kg) | For weighing the simulated muscle volume measuring liquid and the actual use amounts of the first material and the second material |
| | Measuring cups (with one of 5.0 L and two of 0.5 L) | The 5.0 L measuring cup is used for estimating the use amount of the simulated muscle volume measuring liquid; and the 0.5 L measuring cups are used for charging the first material and the second material required to be mixed. |

| Type | Materials | Effect |
|---|---|---|
| | Anhydrous ethanol recovery barrel (5.0 L) | For recovering the simulated muscle volume measuring liquid poured out from the mold |
| | Dilute adhesive liquid recovery barrel (5.0 L) | For recovering the dilute adhesive liquid poured out from the mold |
| | Stirring barrel (5.0 L) | For charging mixed toluene and neoprene adhesive and stirring a mixture therein |
| | Stirring cup (1.0 L) | For mixing the first material and the second material and stirring a mixture therein |
| | Petal-shaped stirrer (0-3000 r/min) | For mixing the first material and the second material and mixing the toluene and the neoprene adhesive |
| | Timer (0.01 s) | For recording the standing time of the simulated muscle volume measuring liquid, recording a mixing time of the first material and the second material, recording a mixing time of the toluene and the neoprene adhesive, recording the standing time of the mold and the like |
| | Mold releasing taper (with a length of 200 mm) | For opening the upper arm mold |
| | Wrench (M14) | For disassembling a screw for a mold mounting hole |
| | Measuring tape (with a length of 1.00 m) | For measuring a dimension of an arm girth of the upper arm |

Figure 3:
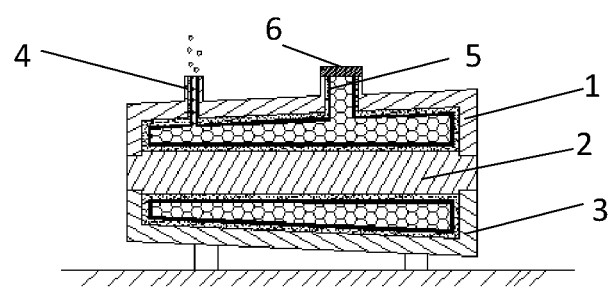
FIG. 3 is a schematic diagram of exhausting an upper arm body with standing in the step S305 according to embodiment 1.

The method of filling the simulated muscles for the limb of the automobile crash test dummy of the present invention specifically comprises the following steps:

Step 1: a filling volume of an inner cavity of a mold and the total mass of a filler were obtained. As shown in FIG. 3, an upper arm mold comprises an upper mold 1, a mold core 2, a lower mold 3, a sprue port 5 and an exhaust port 4, wherein the sprue port 5 is used for casting a mixed filler; the mold core 2 serves as a metal skeleton; and the upper mold 1 and the lower mold 3 are fastened with the screw after being buckled together to form the inner cavity of the mold. Before the simulated muscles were filled into the upper arm, a skin layer had been manufactured in the mold through certain technical means, and there was no any filling matter, but only air which was not exhausted, in a cavity in the skin layer.

S101: the upper arm mold, on the surface of the inner cavity of which the skin layer was prefabricated, was placed on a workbench; by estimating a volume of the cavity in the mold, a sufficient amount of anhydrous ethanol was added in a measuring cup to guarantee that the anhydrous ethanol could be fully poured into the whole mold; the anhydrous ethanol, with the mass of 1360 g, in the measuring cup was weighed with an electronic scale; and the anhydrous ethanol was poured into the cavity of the upper arm mold until the anhydrous ethanol was fully poured into the cavity.

S102: standing was allowed for 20 s so as to exhaust the air in the mold; after standing was completed, the interior of the mold was fully supplemented with the anhydrous ethanol; the rest anhydrous ethanol, with the mass of 670 g, in the measuring cup was weighed, and then the mass of the used anhydrous ethanol in the cavity of the mold was calculated as 690 g; and the anhydrous ethanol was totally poured out of the cavity of the mold and was poured into an anhydrous ethanol recovery barrel. In order to reduce residues of liquid in the cavity in the mold and avoid injuries to a human body in the actual operation process, this embodiment employed the anhydrous ethanol as a measuring liquid and might further employ other volatile and nontoxic liquid with good fluidity as the measuring liquid.

S103: the filling volume of the inner cavity of the mold with the skin layer was calculated:

$$V_{anhydrousethanol}(cm^3) = \frac{M}{0.789} = \frac{690}{0.789} = 874.5 (cm^3) \qquad (4)$$

wherein 0.789 g/cm$^3$ was a density of the anhydrous ethanol.

Through calculation, the volume to be filled in the inner cavity of the mold was obtained as 874.5 cm$^3$.

A foaming volume of the filler required to be equal to the volume measured by using the anhydrous ethanol; meanwhile, by taking a cup residue loss of the filler in the dumping process or other losses into consideration, the mass of the required actually used filler was larger than the actually calculated filling mass; and therefore, a mass redundancy coefficient was added during calculation.

Then, the total mass of the filler was calculated; and the filler was molded by using a one-step foaming method, that is all raw materials were mixed together for stirring and foaming. The filler was formed by mixing two kinds of foaming raw materials, and thus the mass of the filler was equal to a mass sum of the two raw materials. In this embodiment, the filler was a polyurethane foaming solution; and the polyurethane foaming solution referred to an unfoamed liquid obtained by mixing the first material a and the second material b and was easily poured into the mold, wherein the first material a was an isocyanate prepolymer; and the second material b was combined polyether polyols.

The actual use amount of the polyurethane foaming solution might be calculated according to a formula:

$$M_{actually\ used\ filler} = K\rho_{polyurethane}V_{anhydrous\ ethanol} = 1.05 \times 0.12\ g/cm^3 \times 874.5\ cm^3 = 110.2\ g \quad (5)$$

wherein a density $\rho_{polyurethane}=0.12$ g/cm$^3$ of polyurethane sponge obtained after reaction of the polyurethane foaming solution was selected according to a mass of the upper arm of the dummy; K=1.05 was selected according to the lost mass of the polyurethane foaming solution due to residues and the like in the actual preparation process; and by taking the cup residues or other losses of the filler in the dumping process into consideration, the mass of required actually used filler was larger than the actually calculated filling mass. $V_{anhydrous\ ethanol}$ was obtained according to a calculation result in the formula (4).

S104: masses of various components of the filler were calculated.

The polyurethane foaming solution consisted of the first material a and the second material b. The first material a was the isocyanate prepolymer. The second material b was the combined polyether polyols. The isocyanate prepolymer was selected from combination of the following various components: 62 wt% of polymethylene polyphenylisocyanate, 27 wt% of diphenylmethane diisocyanate-4,4'-diisocyanate, 11 wt% of polymer of polymethylenepolyphenyl isocyanate activated with methyloxirane, ethylene oxide ester and 1,2,3-glycerol. The combined polyether polyols were selected from combination of the following various components: 28% by weight of polymer polyol, 65% by weight of polyether polyol, 1% by weight of polyester polyol, 4% by weight of water, 1% by weight of diethanolamine and 1% by weight of other additives. The hardness of the filler after being foamed was decided by the mass ratio of the first material a and the second material b; and the mass ratio (A:B=110:35) of the first material and the second material was selected according to the hardness of the upper arm of the dummy.

According to a formula:

$$m_A + m_B = M_{actually\ used\ filler}$$

$$m_A : m_B = A : B \quad (6)$$

It was deduced from calculation that the specific masses of the first material a and the second material b were as follows:

$$\begin{cases} m_A = M_{actually\ used\ filler} \times \dfrac{A}{A+B} = 26.5(g) \\ m_B = M_{actually\ used\ filler} \times \dfrac{B}{A+B} = 83.7(g) \end{cases} \quad (7)$$

The first material and the second material were weighed according to the calculated masses and placed in the measuring cups.

Step 2: an adhesive liquid film layer was prepared.

The simulated muscles and the skin layer of the dummy limb did not accord with a real human body structure as being made of two different materials and not being connected together. In order to enable the two materials to be closely connected and the dummy limb to be of a structure more similar to the human body, the two materials were combined together by using an adhesion method with an adhesive liquid. In another aspect, due to relatively large viscosity and poor fluidity of an existing adhesive liquid, the existing adhesive liquid was difficult to quickly go in and out of the cavity of a whole limb mold, which made the adhesive liquid not uniformly coated on the inner wall of the skin layer. In order to enable the adhesive liquid to have better fluidity and quickly go in and out of the mold, the inner wall of the skin layer was uniformly coated with the adhesive liquid by using a method of diluting the adhesive liquid with an organic solvent. Specifically, S201: dilution of the adhesive liquid, specifically, the neoprene adhesive was selected as a gluing liquid, the toluene was selected as a diluent, and 2 kg of toluene and 1 kg of neoprene adhesive were weighed according to a weight ratio of 2 to b 1.

S202: the weighed neoprene adhesive and toluene were poured into a stirring barrel for stirring with a petal-shaped stirrer, wherein the stirrer in such shape was strong in mixing performance and more facilitated uniform mixing of the two materials; and the neoprene adhesive and the toluene were stirred for a stirring time of 60 s and at a rotating speed of 1000 r/min for uniform mixing to prepare the dilute adhesive liquid.

S203: the upper arm mold was placed on the workbench top; the mixed dilute adhesive liquid was fully poured into the cavity of the mold for standing for 20 s; and then the dilute adhesive liquid in the cavity of the mold was rapidly poured into a dilute adhesive liquid recovery barrel to enable the inner wall of the skin layer in the upper arm mold to be covered with an adhesive liquid film layer.

Step 3: a filler was prepared.

S301: by employing a one-step foaming molding method, the weighed first material a and second material b were poured into the stirring cup and mixed with the petal-shaped stirrer to form the filler; wherein as the first material a and the second material b were rapid in mixing reaction and required to be uniformly mixed at the same time, so that the stirring time was selected as 9 s, and the rotating speed was selected as 2500 r/min.

S302: the upper arm mold covered with the adhesive liquid film layer and a workbench top were arranged with an included angle of 30 degrees to enable the exhaust port 4 to be higher than a sprue port 5 and facilitate gradual fermentation of the filler from bottom to top, and air in the inner cavity was exhausted out of the inner cavity of the mold.

S303: the mixed filler was rapidly poured into the sprue port 5 of the mold; the filler was gradually foamed in the inner cavity of the mold to form polyurethane foamed sponge, wherein the polyurethane foamed sponge was a final product obtained after fermentation of the polyurethane foaming solution and was further an actually required state of the simulated muscles; and when the polyurethane foamed sponge overflowed from the sprue port, the sprue port was rapidly covered with a metal circular cover 6 to prevent the foamed sponge from overflowing from the sprue port.

S304: standing was allowed for 5 min until the polyurethane foamed sponge was just foamed to the exhaust port 4 and did not overflow from the end part of the exhaust port 4 any more.

S305: the mold was horizontally placed on the workbench for standing for 8 h at the room temperature, and the air was naturally exhausted to complete the filling process.

Step 4: demolding detection on the limb was conducted.

S401: after standing of the upper arm mold was completed, and all screws on the upper arm mold were totally dissembled with an M14 open-end wrench, the upper mold 1 and the lower mold 3 were separated, and then manufactured simulated limb members (including skin, muscles and a metal skeleton) of the upper arm of the dummy were taken out; wherein the mold core 2 in the upper arm mold was an important component of the upper arm mold and further was the skeleton of the upper arm of the dummy.

S402: whether the upper arm body of the dummy had a bulge or collapse or not was detected by using an appearance vision.

Figure 4:
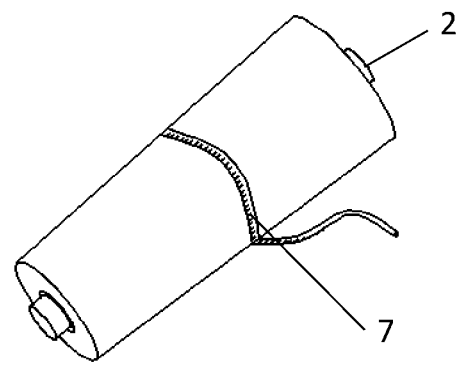
FIG. 4 is a schematic diagram of detecting the dimension of a demolded limb according to embodiment 1.

S403: the middle portion of the upper arm body was selected, as shown in FIG. 4, an arm girth was measured with the measuring tape 7 to obtain that a length L of the arm girth was 302 mm and accorded with the dimension requirement for the upper arm member of the crash test dummy, and then detection was completed.

Embodiment 2: Manufacturing of Dummy Lower Arm

The contents similar to Embodiment 1 will not be described in detail, and only different contents are described below.

The mass of the anhydrous ethanol used for a lower arm was: 613 g.

A filling volume of an inner cavity of a mold of a thigh was:

$$V_{anhydrousethanol}(\text{cm}^3) = \frac{M}{0.789} = \frac{613}{0.789} = 776.9(\text{cm}^3) \tag{8}$$

A polyurethane foaming solution consisted of a first material a and a second material b. The first material a was an isocyanate prepolymer. The second material b was combined polyether polyols. The isocyanate prepolymer was selected from combination of the following various components: 63 wt% of polymethylene polyphenylisocyanate, 26 wt% of diphenylmethane diisocyanate-4,4'-diisocyanate, 11 wt% of polymer of polymethylenepolyphenyl isocyanate activated with methyloxirane, ethylene oxide ester and 1,2, 3-glycerol. The combined polyether polyols were selected from combination of the following various components: 25% by weight of polymer polyol, 68% by weight of polyether polyol, 1% by weight of polyester polyol, 4% by weight of water, 1% by weight of diethanolamine and 1% by weight of other additives. The actual use amount of the polyurethane foaming solution was:

$$M_{actually\ used\ filler} = K\rho_{polyurethane}V_{anhydrous\ ethanol} = 1.05 \times 0.12\ \text{g/cm}^3 \times 776.9\ \text{cm}^3 = 97.9\ \text{g} \tag{9}$$

wherein a density $\rho_{polyurethane} = 0.12$ g/cm³ of polyurethane sponge obtained after reaction of the polyurethane foaming solution was selected according to a mass of an upper arm of a dummy.

The first material selected the isocyanate prepolymer; the second material selected the combined polyether polyols; and the mass ratio of the first material and the second material (A:B=110:30) was selected according to the hardness of the lower arm of the dummy.

It was deduced from calculation that the specific masses of the first material and the second material were as follows:

$$\begin{cases} m_A = M_{actually\ used\ filler} \times \frac{A}{A+B} = 21.0(\text{g}) \\ m_B = M_{actually\ used\ filler} \times \frac{B}{A+B} = 76.9(\text{g}) \end{cases} \tag{10}$$

Mixing of the first material and the second material: a stirring time was 10 s, and a rotating speed was 2700 r/min.

Adhesive liquid:

the neoprene adhesive was selected as a gluing liquid, the toluene was selected as a diluent, and 2 kg of toluene and 1 kg of neoprene adhesive were weighed according to a weight ratio of 2 to 1.

Mixing of the gluing liquid and the diluent: a stirring time was 90 s, and a rotating speed was 1300 r/min.

The mold was horizontally placed on the workbench for standing for 9 h at the room temperature after being filled, and the air was naturally exhausted to complete the filling process.

Embodiment 3: Manufacturing of Dummy Thigh

The contents similar to Embodiment 1 will not be described in detail, and only different contents are described below.

The mass of the anhydrous ethanol used for a thigh was: 1308 g.

A filling volume of an inner cavity of a mold of a thigh was:

$$V_{anhydrousethanol}(\text{cm}^3) = \frac{M}{0.789} = \frac{1308}{0.789} = 1657.8(\text{cm}^3) \tag{11}$$

A polyurethane foaming solution consisted of a first material a and a second material b. The first material a was an isocyanate prepolymer. The second material b was combined polyether polyols.

The actual use amount of the polyurethane foaming solution was:

$$M_{actually\ used\ filler} = K\rho_{polyurethane}V_{anhydrous\ ethanol} = 1.05 \times 0.13\ \text{g/cm}^3 \times 1657.8\ \text{cm}^3 = 226.3\ \text{g} \tag{12}$$

wherein a density $\rho_{polyurethane} = 0.13$ g/cm³ of polyurethane sponge obtained after reaction of the polyurethane foaming solution was selected according to a mass of an upper arm of a dummy.

The first material selected the isocyanate prepolymer; the second material selected the combined polyether polyols; and the mass ratio of the first material and the second material (A:B=110:28) was selected according to the hardness of the thigh of the dummy.

It was deduced from calculation that the specific masses of the first material and the second material were as follows:

$$\begin{cases} m_A = M_{actually\ used\ filler} \times \frac{A}{A+B} = 45.9(\text{g}) \\ m_B = M_{actually\ used\ filler} \times \frac{B}{A+B} = 180.4(\text{g}) \end{cases} \tag{13}$$

Mixing of the first material and the second material: a stirring time was 12 s, and a rotating speed was 3000 r/min.

Adhesive liquid:

The neoprene adhesive was selected as a gluing liquid, the toluene was selected as a diluent, and 4 kg of toluene and 2 kg of neoprene adhesive were weighed according to a weight ratio of 2 to 1.

Mixing of the gluing liquid and the diluent: a stirring time was 120 s, and a rotating speed was 1500 r/min.

The mold was horizontally placed on the workbench for standing for 10 h at the room temperature after being filled, and the air was naturally exhausted to complete the filling process.

Although it has been described with reference to the drawings, the present invention is still not limited to the above implementation. The above implementation is not construed as a limitation, but is merely illustrative. A person of ordinary skill in the art can further make several many variants under the reveal of the present invention without departing from the purpose of the present invention, and those variants should be included in the protection scope of the present invention.

What is claimed is:

1. A method of filling simulated muscles for a limb of an automobile crash test dummy, wherein the simulated muscles are molded with foaming in an inner cavity of a mold; the mold comprises an upper mold, a mold core, a lower mold, a sprue port and an exhaust port; and the upper mold and the lower mold are buckled to form the inner cavity of the mold; the method comprises the following steps:

step 1: obtaining a filling volume of the inner cavity of the mold by using a liquid casting method, and then calculating a total mass of a filler according to the filling volume and a known density of foamed sponge obtained after foaming of the filler, wherein the filler is composed of a first material and a second material; and obtaining masses of the first material and the second material according to the obtained total mass of the filler and a preset hardness of the limb, wherein a skin layer is prefabricated on an inner surface of the mold in an attaching manner; and the inner cavity of the mold herein refers to a space except for the skin layer in the mold, and the inner cavity mold is empty at this time;

wherein, the step 1 specifically comprises the following steps:

S101: fully pouring a sufficient amount of measuring liquid into the inner cavity, with the skin layer, of the mold, and obtaining the filling volume of the inner cavity of the mold by using the liquid casting method:

$$V_{liquid}(\text{cm}^3) = \frac{M}{\rho} \quad (1)$$

wherein $\rho$ is a density of the measuring liquid, and M is a weight of the measuring liquid; and the measuring liquid is volatile and nontoxic liquid, and the liquid has the viscosity of 1.1-1.5 cP, and preferably, is anhydrous ethanol;

S102: taking a cup residue loss in a process of dumping the filler into consideration, setting a mass redundancy coefficient, and calculating the total mass of the actually used filler in the inner cavity of the mold:

$$V_{filler} = V_{liquid}$$

$$M_{filler} = \rho_{filler} V_{filler}$$

$$M_{actuallyusedfiller} = KM_{filler} \quad (2)$$

wherein $\rho_{filler}$ is a density of the foamed sponge obtained after foaming of the filler; $V_{filler}$ is the filling volume, calculated in S101 of the inner cavity of the mold; K is the mass redundancy coefficient; $M_{filler}$ is the total mass of the filler just fully filled in the inner cavity of the mold; and $M_{actuallyusedfiller}$ used filler is the total mass of the actually used filler;

S103: calculating masses of various components of the filler, wherein the filler is composed of the first material and the second material, a mass ratio of the first material to the second material is set according to the preset hardness of the limb so as to deduce the masses of the first material and the second material, and a calculation formula is as follows:

$$m_A = M_{actually\ used\ filler} \times \frac{A}{A+B} \quad (3)$$

$$m_B = M_{actually\ used\ filler} \times \frac{B}{A+B}$$

wherein $m_A$ is the mass of the first material; $m_B$ is the mass of the second material; and A:B is the mass ratio of the first material to the second material.

step 2: preparing an adhesive liquid film layer fully pouring an adhesive liquid into the inner cavity of the mold for stilling for 20-40 s, and pouring out a residual adhesive liquid in the inner cavity of the mold to form an adhesive liquid film layer on the inner wall of the skin layer of the inner cavity of the mold;

step 3: preparing a filler pouring a weighed first material and second material into a stirring cup for stirring for 9-12 s at a room temperature and a rotating speed of 2500-3000 r/min so as to form the filler with mixing; injecting the mixed filler into the inner cavity of the mold; enabling the filler to gradually be foamed in the mold to form foamed sponge; allowing the foamed sponge to stand for 5-8 min until the foamed sponge is foamed to the exhaust port and does not overflow from an end part of the exhaust port; and then completing the filling process;

step 4: conducting demolding detection on the limb taking out a manufactured dummy limb member after separating the upper mold from the lower mold, detecting whether the dummy limb has a bulge or collapse or not by using an appearance vision; and if there is no bulge or collapse, then selecting the middle portion of the limb, and measuring the outside diameter of the middle portion with a measuring tape to judge whether the outside diameter accord with a dimension of the inner surface of the mold or not so as to complete detection on the limb.

2. The method according to claim 1, wherein, preparation of the adhesive liquid film layer in the step 2 is as follows: a gluing liquid and a diluent are weighed according to a weight ratio of 2 to 1 and are uniformly mixed in a stirring barrel for a stirring time of 60-120 s and at a rotating speed of 800-1500 r/min to prepare a dilute adhesive liquid.

3. The method according to claim 1, wherein the step 3 specifically comprises the following steps:

S301: pouring a weighed first material and second material into the stirring cup for stirring for 9-12 s at the room temperature and the rotating speed of 2500-3000 r/min, and forming the filler with mixing;

S302: arranging the mold covered with the adhesive liquid film layer and a workbench top at an angle to enable the exhaust port to be higher than the sprue port and facilitate gradual fermentation of the filler from bottom to top, and exhausting air out of the inner cavity of the mold;

S303: pouring the mixed filler into the sprue port of the mold; enabling the filler to be gradually foamed in the inner cavity of the mold to form the foamed sponge; and when the foamed sponge overflows from the sprue port, covering the sprue port with a metal cover plate to prevent the foamed sponge from overflowing from the sprue port;

S304: conducting standing for 5-8 min until the foamed sponge is foamed to the exhaust port and no overflowing occurs after a small quantity of foamed sponge overflows from the end part of the exhaust port;

S305: horizontally placing the mold on the workbench for standing for 6-10 h at the room temperature, and enabling air in the inner cavity to be naturally exhausted to complete the filling process.

4. The method according to claim 2, wherein the gluing liquid is a neoprene adhesive; and the diluent is toluene.

\* \* \* \* \*